US012642173B2

(12) United States Patent

Isaac et al.

(10) Patent No.: US 12,642,173 B2

(45) Date of Patent: Jun. 2, 2026

(54) DEFLECTOR DOOR FOR ACCESSING A SIEVE OF A COMBINE HARVESTER HAVING A SEED MILL

(71) Applicant: CNH Industrial America LLC, New Holland, PA (US)

(72) Inventors: Nathan E. Isaac, Lancaster, PA (US); Trevor Book, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 397 days.

(21) Appl. No.: 18/367,730

(22) Filed: Sep. 13, 2023

(65) Prior Publication Data

US 2025/0081888 A1      Mar. 13, 2025

(51) Int. Cl.
*A01D 41/12*          (2006.01)
*A01F 12/44*          (2006.01)

(52) U.S. Cl.
CPC ..... *A01D 41/1261* (2013.01); *A01D 41/1243* (2013.01); *A01F 12/446* (2013.01)

(58) Field of Classification Search
CPC ............ A01D 41/1261; A01D 41/1243; A01F 12/446; A01F 12/40
See application file for complete search history.

(56) References Cited

U.S. PATENT DOCUMENTS 4,056,107 A * 11/1977 Todd .................. A01D 41/1243
                                                      241/186.3
6,325,713 B1    12/2001 Haar et al.

6,547,169 B1 * 4/2003 Matousek .......... A01D 41/1243
                                                      239/653
7,744,450 B2    6/2010 Hoskinson et al.
8,585,475 B2   11/2013 Isaac et al.
10,004,176 B2   6/2018 Mayerle
10,314,232 B2   6/2019 Isaac et al.
(Continued)

FOREIGN PATENT DOCUMENTS

DE          3735669 A1 * 5/1989 ......... A01D 41/1243
DE        10219895 A1 * 12/2003 ............. A01F 12/40
(Continued)

OTHER PUBLICATIONS

The Extended European Search Report issued Feb. 10, 2025, by the European Patent Office in corresponding European Patent Application No. 24199662.8-1105. (11 pages).

*Primary Examiner* — Arpad Fabian-Kovacs
(74) *Attorney, Agent, or Firm* — Buchanan Ingersoll & Rooney PC

(57)          ABSTRACT

An agricultural harvester includes a straw hood having a hollow interior space for receiving material other than grain (MOG) from a threshing and separating system of the harvester and chaff from a sieve of a cleaning system of the harvester. A weed seed mill is mounted to the straw hood. An access door is moveably mounted to the straw hood between a lowered operational position and a raised service position. In the lowered operational position, the access door is positioned to direct the stream of chaff either into or towards the inlet of the weed seed mill. In the raised service position, a user-accessible passageway is formed from an exterior of the agricultural harvester to the sieve such that a user can access the sieve from an exterior of the harvester.

19 Claims, 4 Drawing Sheets

(56)                    References Cited

U.S. PATENT DOCUMENTS

| | | | |
|---|---|---|---|
| 2005/0282602 A1 * | 12/2005 | Redekop | A01F 12/40 460/112 |
| 2018/0070534 A1 * | 3/2018 | Mayerle | A01D 41/1243 |
| 2018/0352748 A1 * | 12/2018 | Rittershofer | A01F 12/40 |
| 2018/0368319 A1 * | 12/2018 | Desmet | A01F 17/02 |
| 2020/0236850 A1 * | 7/2020 | Mayerle | A01D 41/14 |
| 2020/0337238 A1 | 10/2020 | Gorge et al. | |
| 2023/0086794 A1 | 3/2023 | Van De Wege et al. | |
| 2023/0141301 A1 | 5/2023 | Mayerle | |
| 2023/0240184 A1 * | 8/2023 | Mayerle | A01D 41/1243 460/112 |
| 2023/0240191 A1 | 8/2023 | Mayerle | |

FOREIGN PATENT DOCUMENTS

| | | | | |
|---|---|---|---|---|
| EP | 1421843 | A2 * | 5/2004 | A01F 12/40 |
| EP | 3172959 | A1 * | 5/2017 | A01F 29/06 |
| EP | 3236740 | B1 | 11/2017 | |
| EP | 4082324 | A1 * | 11/2022 | A01F 12/40 |
| WO | WO-2020181385 | A1 * | 9/2020 | A01F 12/40 |

* cited by examiner

99

99

DEFLECTOR DOOR FOR ACCESSING A SIEVE OF A COMBINE HARVESTER HAVING A SEED MILL

FIELD OF THE INVENTION

The present invention relates to agricultural harvesters. More specifically, the present invention relates to a deflector door for accessing a sieve of an agricultural harvester that also has a weed seed mill.

BACKGROUND OF THE INVENTION

As is described in U.S. Pat. No. 10,314,232 to CNH America LLC (the '232 Patent), which is incorporated by reference in its entirety and for all purposes, an agricultural harvester known as a "combine" is historically termed such because it combines multiple harvesting functions with a single harvesting unit, such as picking, threshing, separating and cleaning. The separating system of the combine directs the non-grain material to a residue system. The residue system distributes the non-grain material through a chopper, a spreader, and/or a windrow chute before it is distributed onto the field.

Crop residue that is discharged onto fields often contains lost grain and seeds, including shrunken crop seeds and weed seeds. Most or all of the seeds are in the chaff that exits the cleaning system. Many of the seeds are not destroyed and remain viable after exiting the combine. Viable seeds can germinate and sprout in the field, resulting in the spread of undesired weeds and potential crop disease. Weeds that sprout are typically killed by tillage or chemical treatment, however, weed control measures such as these are costly. Moreover, these weed control measures require additional equipment passing over the field, which can increase soil compaction and adversely impact the condition of the field.

The '232 Patent discloses a weed seed mill positioned for destroying the weed seeds through shearing forces. A weed seed mill may also be referred to herein or in the art as a seed processor, chaff mill, chaff mill assembly, or chaff processor. The seed mill is configured to receive crop residue from a cleaning system of the combine and destroy or damage seeds through shearing forces, so that when the seeds exit the combine, the seeds are no longer viable and able to germinate.

Described herein is a movable door that moves between a normal operating position and a raised service position. In the normal operating position, the door serves as a boundary wall (or deflector) for funneling chaff into the weed seed mill. And, in the raised service position, the raised door creates a passageway for accessing internal components of the combine, including the sieves.

SUMMARY OF THE INVENTION

According to one aspect of the invention, an agricultural harvester includes a straw hood having a hollow interior space for receiving material other than grain (MOG) from a threshing and separating system of the harvester and chaff from a sieve of a cleaning system of the harvester. A weed seed mill is mounted to the straw hood. The weed seed mill comprises (i) a stator defining an inlet for receiving a stream of the chaff from the sieve, and (ii) a rotor positioned at least partially within the stator, the weed seed mill being configured to devitalize weed seeds contained within the chaff. An access door is moveably mounted to the straw hood between a lowered operational position and a raised service position.

In the lowered operational position, the access door is positioned to direct the stream of chaff either into or towards the inlet of the weed seed mill. In the raised service position, a user-accessible passageway is formed from an exterior of the agricultural harvester to the sieve such that a user can access the sieve from an exterior of the harvester.

According to another aspect of the invention, a weed seed mill for an agricultural harvester includes a stator defining an inlet for receiving a stream of the chaff from a sieve of a cleaning system of the agricultural harvester; a rotor positioned at least partially within the stator, the rotor and concave together being configured to devitalize weed seeds contained within the chaff; and an access door that is moveable relative to the inlet of the stator between a lowered operational position and a raised service position. In the lowered operational position, the access door is positioned to direct the stream of chaff either into or towards the inlet of the weed seed mill. In the raised service position, a user-accessible passageway is formed from an exterior of the agricultural harvester to the sieve such that a user can access the sieve from an exterior of the harvester.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
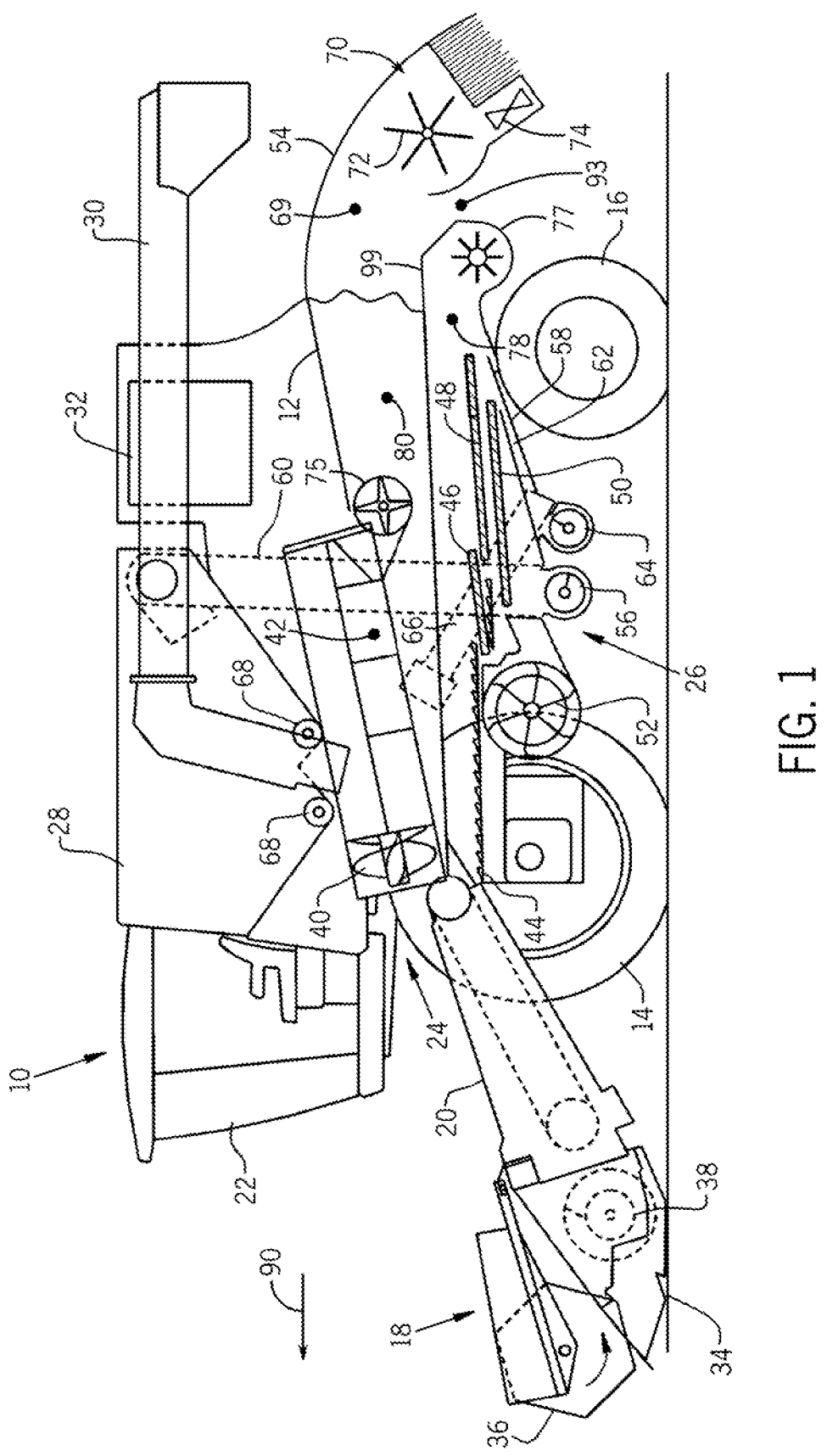
FIG. 1 is a schematic side view of an embodiment of an agricultural harvester, wherein various segments of the harvester are cut-away to reveal internal details including an access door for a sieve, wherein the access door is shown in a lowered position during normal operation.

It is noted that the figures depict the elements in schematic form and are not necessarily to scale.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

The terms "grain", "chaff", "straw", and "tailings" are used principally throughout this specification for convenience but it is to be understood that these terms are not intended to be limiting. Thus "grain" refers to that part of the crop material that is threshed and separated from the discardable part of the crop material, which is referred to as chaff and includes straw, seeds, and other non-grain crop material.

Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "forward" and "rearward" as well as "front" and "rear" are determined with reference to the forward direction 90 of travel of the harvester.

Referring now to the drawings, and more particularly to FIG. 1, there is shown an agricultural harvester in the form of a combine 10, which generally includes a chassis (frame) 12, ground engaging wheels 14 and 16, a header 18, a feeder housing 20, an operator cab 22, a threshing and separating system 24, a cleaning system 26, a grain tank 28, and an unloading conveyance 30. Motive force is selectively applied to the front wheels 14 through a power plant in the form of a diesel engine 32 and a transmission (not shown). Both the front and rear wheels 14 and 16 may be steerable.

The header 18 is mounted to the front of the combine 10 and includes a cutter bar 34 for severing crops from a field during forward motion of combine 10. A rotatable reel 36 feeds the crop into the header 18, and a double auger 38 feeds the severed crop laterally inwardly from each side toward the feeder housing 20. The feeder housing 20 conveys the cut crop to threshing and the separating system 24.

The threshing and separating system 24 generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain that has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52, which provides an airflow through the sieves, to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of the lower sieve 50. The clean grain auger 56 receives clean grain from each sieve 48, 50 and from bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

Although a rotary combine has been described thus far, it should be understood that the details presented herein are not limited to rotary combines and may be applicable to other machines, such as conventional combines and cross harvester combines.

A residue handling system 70 is integrated in the rear of harvester 10. Residue handling system 70 generally comprises a straw hood 54, a discharge beater 75, a weed seed mill 77, a chopper 72, and spreaders 74 that are all at least partially positioned within straw hood 54.

Referring now to the individual components of residue handling system 70, straw hood 54 includes opposing side walls that are connected to a top wall. The walls together define an interior space. The interior space is divided between a top passageway 69 that leads to chopper 72, and a bottom passageway 83 that leads to seed mill 77.

Discharge beater 75 is configured to deliver a stream 80 of straw material into passageway 69 towards chopper 72. Chopper 72 includes a rotor that is at least partially surrounded by a chopper housing 57. Chopper 72 is configured to rotate and chop the straw material of stream 80 and deliver it to spreader 74. The spreader 74 discharges the non-grain crop material across the harvested width behind harvester 10. Turning now to the cleaning system 26, that system which includes sieve 48 is configured to deliver a stream 78 of chaff material along passageway 83. Sieve 48 is mounted to a reciprocating cleaning shoe, as is known in the art. Further details of discharge beater 75, chopper 72 and spreader 74 are provided in the '232 Patent.

It is noted that chopper 72 may be omitted, if so desired. For example, if beater 75 has two speed settings (e.g., high and low), there may not be a need to include a separate chopper 72 because the beater 75 can act as a chopper when it is operated at the high speed setting.

Figure 2:
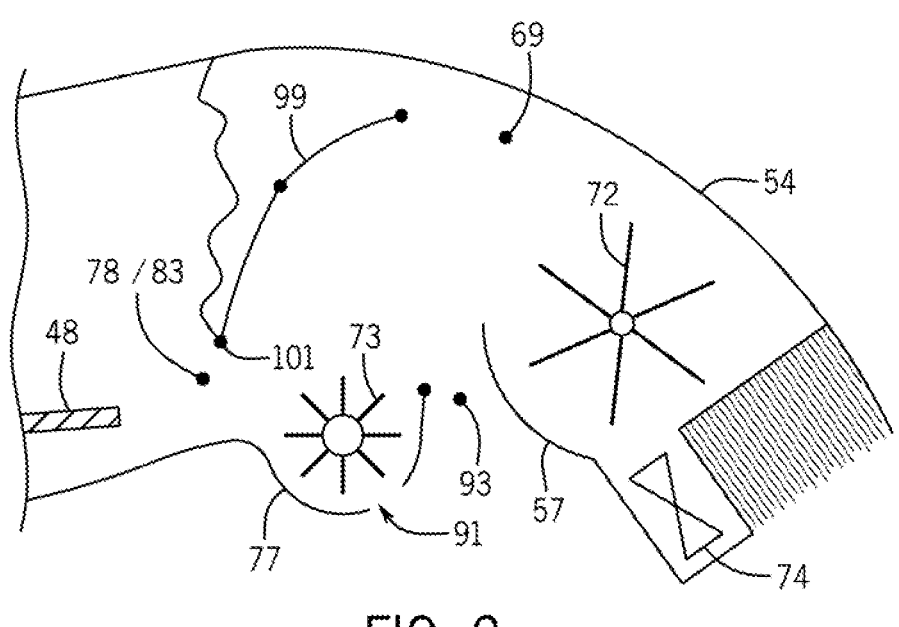
FIG. 2 is a detailed view of FIG. 1, with the exception that the access door is shown in a raised position during servicing.
Figure 3:
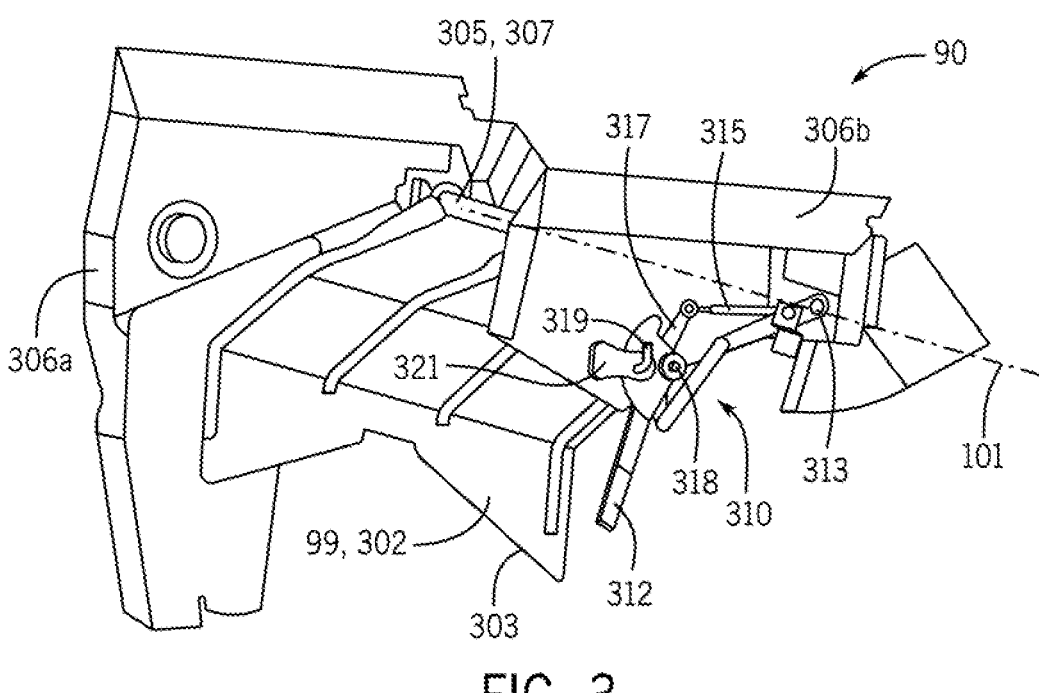
FIGS. 3 and 4 depict isometric views of the access door of FIGS. 1 and 2, wherein the access door is shown in the lowered position.
Figure 4:
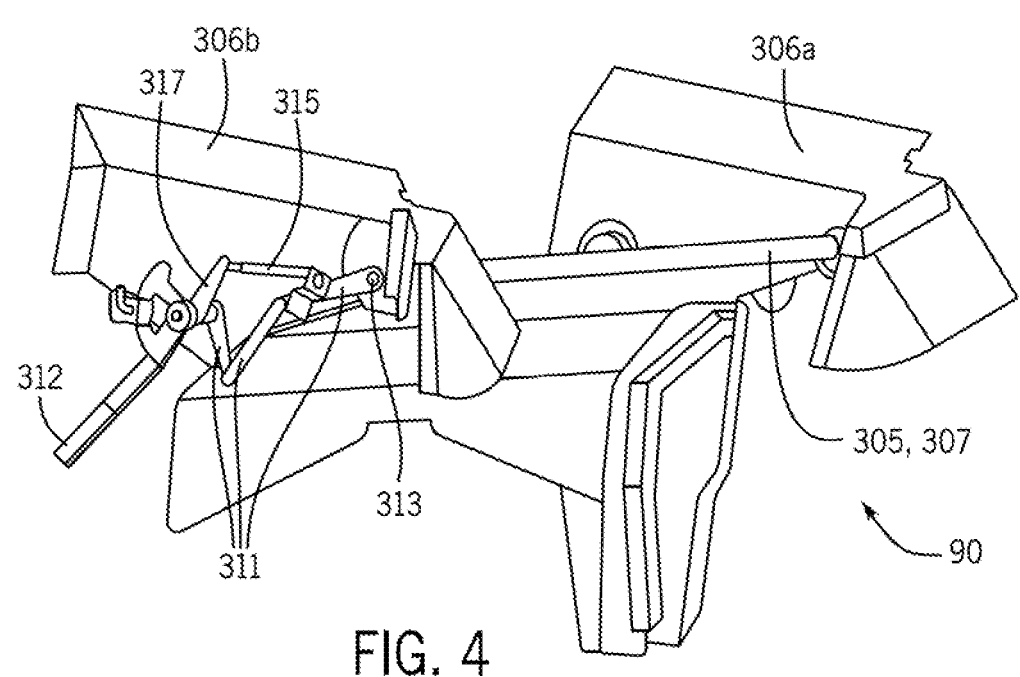

As is described in U.S. Patent App. Pub. No. 2023/0086794, which is incorporated by reference in its entirety, a weed seed mill 77 is positioned at the bottom side of straw hood 54. Passageway 83 leads to an inlet of seed mill 77 such that seed mill 77 receives a portion of second stream 78 of chaff from the cleaning system 26 via passageway 83. Seed mill rotor 73 is positioned within the hollow interior of mill 77, and is surrounded by a concave or stator, as is known in the art and described in the '232 Patent. Destroyed seeds are outputted from seed mill 77 via an outlet port 91 (FIG. 2). Seed mills 77 are powered by a belt (or other device) that may be positioned either inside or outside of straw hood 54. Further details in connection with seed mills 77 are described in U.S. Pat. No. 10,004,176, which is incorporated by reference in its entirety. Seed mills 77 have a rotor that rotates at a higher speed than chopper 72, for example, for devitalizing weed seeds.

A sieve access door 99 is pivotably mounted to straw hood 54, chassis 12 or a fixed point on the combine. The door 99 is pivotably mounted about a pivot axis 101 by a hinge, for example. Door 99 moves between a lowered "operational" position (FIG. 1) and a raised "service" position (FIG. 2). In the lowered position of door 99, which is shown in FIG. 1, door 99 prevents the passage of the chaff stream 78 into passageway 69. In other words, in the lowered position, door 99 at least partially delimits passageway 83 from passageway 69. Door 99 also serves as a deflector or boundary wall to funnel the chaff stream into the inlet of weed seed mill 77.

In the raised "service" position of door 99, the passageway created by the raised door 99 provides user access to the sieve 48 (as well as other components of the combine 10). For example, a user can inspect, adjust, remove, replace and/or repair, sieve 48 via the passageway created by the raised door 99. The user can access said passageway via an open space 93 disposed between the chopper 72 and the seed mill 77. Open space 93 may or may not be covered by an additional cover (not shown).

Turning now to FIGS. 3-6, door 99 is shown in detailed form. Door 99 may constitute a component of combine 10, a component of residue handling system 70 and/or a component of weed seed mill 77. For example, door 99, straw hood 54 and/or weed seed mill 77 may constitute a sub-assembly.

Door 99 is an assembly comprising two or more interconnected panels 302 (three shown) that are pivotally connected about pivot axis 101. Panels 302 are fixed to each other such that there is no relative motion between the panels 302, however, the panels 302 could be designed to pivot (or move) relative to one another, if so desired. Although not shown, rubber seals may be provided on the free end 303 of the lowermost panel 302 for engaging with a surface near the inlet of the seed mill 77. The attached end 305 of the uppermost panel 302 forms a hub 307 about which the door 99 pivots. Hub 307 at least partially defines pivot axis 101. Door 99 is shown mounted between two stationary side panels 306a, b that form either internally or externally mounted side walls of the combine 10. Panels 306a,b may represent panels forming straw hood 54.

Figures 5, 6:
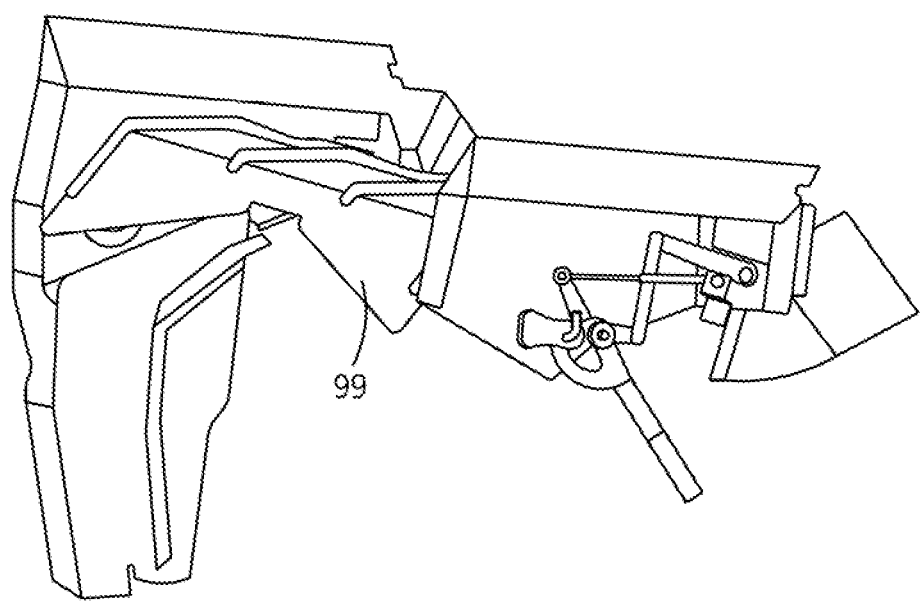
FIGS. 5 and 6 depict isometric views of the access door of FIGS. 3 and 4, wherein the access door is shown in the raised position.

A linkage 310 is connected to the door 99 for moving the door between the lowered "operational" position (FIGS. 3 and 4) and the raised "service" position (FIGS. 5 and 6). An 'input' end of linkage 310 comprises an elongated handle 312 that is capable of being grasped and moved by a user, whereas an 'output' end of linkage 310 comprises a rotatable shaft 313. Shaft 313 is capable of rotating about axis 101 but cannot translate relative to side panels 306a,b. Shaft 313 (optionally) passes through both of side panels 306a,b. Handle 312 is pivotably mounted to side wall 306b (or other stationary surface) by a fastener or pin 318. Handle 312 is configured to be rotated about pin 318 relative to the stationary side wall 306b. Shaft 313 may be keyed (or otherwise connected) to hub 307 and may be positioned at least partially through an interior of hub 307. Linkage 310 further comprises three links 311 that are interconnected between the handle 312 and shaft 313. Links 311 may constitute a four-bar linkage, for example. The links 311 are pinned together such that they can pivot with respect to one another, as shown. The link 311 of the three links 311 that is positioned closest to pin 318 is keyed to pin 318 or handle 312 such that said closest link 311 pivots along with handle 312 about the axis of pin 318.

Another link 317 is keyed to pin 318 or handle 312 such that link 317 also pivots along with handle 312. A biasing device 315 has a first end that is connected to link 317 and a second end that is connected to side wall 306b (or a stationary bracket that is connected to side wall 306b). Biasing device 315 may be a spring, counterweight, strut, gas strut, etc. Biasing device 315 aids in movement of the linkage 310 from the lowered "operational" position to the raised "service" position, and, once the door 99 is in the raised position, biasing device 315 assists in retaining the door 99 in the raised position. It should be understood that, in summary, rotation of handle 312 causes articulation of the links of linkage 310 which causes rotation of shaft 313, which causes movement of door 99. A spring-loaded pin 319 is releasably connected to an opening in handle 312 for retaining the handle 312 in a fixed position when the door 99 is maintained in the lowered position. Pin 319 may be captivated to side wall 306b or a stationary bracket 321 that is fixed to side wall 306b. To release handle 312 from side wall 306b, a user would pull the pin 319 outwardly away from side wall 306b and against a bias of the spring of the pin 319.

Although not shown, the door 99 may have an active element at the pivot axis 101, such as a roller that would prevent material from accumulating at that axis 101. The roller may be free-turning or rotated by a motor (electric, hydraulic), or belt driven. The roller would pivot about the same axis as the door 99 and the door 99 would remain in constant clearance to the roller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester comprising:
   a straw hood having a hollow interior space that receives material other than grain (MOG) from a threshing and separating system of the harvester and chaff from a sieve of a cleaning system of the harvester;
   a weed seed mill mounted to a frame of the harvester or the straw hood, the weed seed mill comprising a stator defining a partially-enclosed interior region and an inlet through which a stream of the chaff from the sieve is delivered into the interior region, and a rotor positioned at least partially within the interior region of the stator, the weed seed mill devitalizing weed seeds contained within the chaff; and
   an access door that is moveably mounted within the straw hood, the access door being moveable between a lowered operational position and a raised service position, wherein, in the lowered operational position, the access door encloses the rotor and constitutes a portion of the stator of the weed seed mill and is arranged to direct the stream of chaff either into or towards the inlet of the weed seed mill, and
   wherein, in the raised service position, a user-accessible passageway is formed from an exterior of the agricultural harvester, through the interior region of the stator and to the sieve such that a user can access the sieve from the exterior of the agricultural harvester.

2. The agricultural harvester of claim 1, further comprising the sieve of the cleaning system of the harvester.

3. The agricultural harvester of claim 1, further comprising a straw chopper positioned within the straw hood, the straw chopper receiving the MOG from the threshing and separating system of the harvester, chopping the MOG, and outputting the chopped MOG, wherein the rotor of the weed seed mill rotates at a higher speed than a rotor of the chopper.

4. The agricultural harvester of claim 3, wherein the user-accessible passageway is defined between the straw chopper and the stator of the weed seed mill.

5. The agricultural harvester of claim 3, further comprising a spreader that receives and then discharges the chopped MOG, wherein the user-accessible passageway is disposed between the weed seed mill and the spreader.

6. The agricultural harvester of claim 1, further comprising a linkage that moves the access door between the lowered operational position and the raised service position.

7. The agricultural harvester of claim 6, wherein the linkage comprises a handle that is graspable by a user, one or more links connected to the handle, and a shaft connected to the one or more links as well as the access door.

8. The agricultural harvester of claim 7, wherein the shaft is fixed to the access door enabling movement of the handle that causes movement of the one or more links, resulting in rotation of the shaft and movement of the access door between the lowered operational position and the raised service position.

9. The agricultural harvester of claim 7, wherein the linkage further comprises a biasing device having one end that is connected either directly or indirectly to the handle, and another end that is connected to a stationary point on the straw hood, wherein the biasing device is assists with movement of the access door.

10. The agricultural harvester of claim 1, wherein, in the lowered operational position, the access door either limits or prevents user access to the sieve via the user-accessible passageway.

11. The agricultural harvester of claim 1, wherein a fixed end of the access door constitutes a portion of the inlet of the stator.

12. The agricultural harvester of claim 11, wherein the access door is pivotable about the fixed end of the access door.

13. A weed seed mill for an agricultural harvester, the weed seed mill comprising:

a stator defining a partially-enclosed interior region and an inlet through which a stream of chaff from a sieve of a cleaning system of the agricultural harvester is delivered into the interior region;

a rotor positioned at least partially within the interior region of the stator, the rotor and stator together devitalizing weed seeds contained within the chaff; and an access door that is moveable relative to the rotor between a lowered operational position and a raised service position, wherein, in the lowered operational position, the access door encloses the rotor and constitutes a portion of the stator of the weed seed mill and is positioned to direct the stream of chaff either into or towards the inlet of the stator, and wherein, in the raised service position, a user-accessible passageway is formed from an exterior of the agricultural harvester, through the interior region of the stator and to the sieve such that a user can access the sieve from the exterior of the agricultural harvester.

14. The weed seed mill of claim 13, further comprising a linkage that moves the access door between the lowered operational position and the raised service position.

15. The weed seed mill of claim 14, wherein the linkage comprises a handle that is graspable by a user, one or more links connected to the handle, and a shaft connected to the one or more links as well as the access door.

16. The weed seed mill of claim 15, wherein the shaft is fixed to the access door enabling movement of the handle that causes movement of the one or more links, resulting in rotation of the shaft and movement of the access door between the lowered operational position and the raised service position.

17. The weed seed mill of claim 15, wherein the linkage further comprises a biasing device having one end that is connected either directly or indirectly to the handle, and another end that is connected to a stationary point on the straw hood, wherein the biasing device assists with movement of the access door.

18. The weed seed mill of claim 15, wherein a fixed end of the access door constitutes a portion of the inlet of the stator.

19. The weed seed mill of claim 18, wherein the access door is pivotable about the fixed end of the access door.

* * * * *